Sept. 12, 1950     D. W. MARTIN     2,522,481
FLUID MOTOR

Filed Aug. 14, 1948     2 Sheets-Sheet 1

Inventor
DANA W. MARTIN
By Harold W. Eaton
Attorney

Sept. 12, 1950     D. W. MARTIN     2,522,481
FLUID MOTOR

Filed Aug. 14, 1948     2 Sheets-Sheet 2

Inventor
DANA W. MARTIN
By Harold W. Eaton
Attorney

Patented Sept. 12, 1950

2,522,481

UNITED STATES PATENT OFFICE 2,522,481

FLUID MOTOR

Dana W. Martin, Stow, Mass., assignor to Norton Company, Worcester, Mass., a corporation of Massachusetts Application August 14, 1948, Serial No. 44,380

5 Claims. (Cl. 121—147)

1

This invention relates to hydraulic motors and more particularly to a reciprocating type motor.

One object of the invention is to provide a simple and thoroughly practical hydraulic motor. Another object of the invention is to provide a unitary hydraulic motor containing a piston and cylinder and a control valve therefor. Another object of the invention is to provide a hydraulic motor in which one stroke of the control valve serves to impart one complete reciprocation to the motor piston. A further object of the invention is to provide a hydraulic motor including a piston and cylinder and a control valve therefor together with suitable controls whereby the length and speed of the reciprocatory stroke of the piston may be readily adjusted and controlled. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of the invention.

Figure 1:
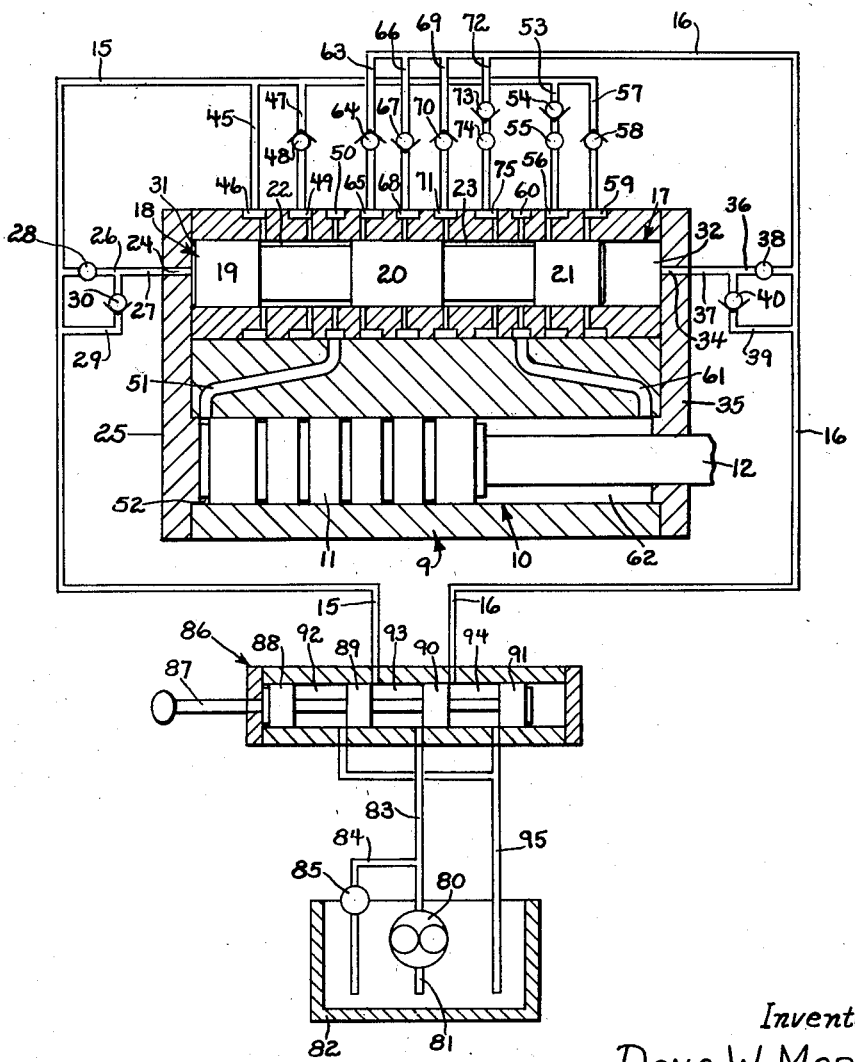
Fig. 1 is a combined sectional view through the fluid motor and control valve and a piping diagram, showing the control valve in a left hand end position.

A hydraulically operated motor is provided comprising a casing 9 having a cylinder 10 which contains a slidably mounted piston 11 formed on the end of a piston rod 12. Fluid under pressure may be passed either through a pipe 15 or a pipe 16 to actuate the piston 11 in a manner to be hereinafter described. The casing 9 is provided with an integrally formed control valve comprising a valve cylinder 17 having a slidably mounted valve member 18. The valve member 18 is provided with a plurality of spaced pistons 19, 20 and 21 formed integrally therewith which form spaced valve chambers 22 and 23 therebetween. The pipe 15 is connected to a port 24 in a cylinder end cap 25 by means of pipes 26 and 27, the pipe 26 having a throttle valve 28 therein, and the pipe 15 is also connected to the port 24 by means of a pipe 29 and the pipe 27, the pipe 29 having a ball check valve 30 therein. The port 24 admits fluid to or discharges it from the left

2 hand end chamber 31 of the valve cylinder 17.

Similarly, the pipe 16 is connected to a port 34 in a cylinder end cap 35 by means of pipes 36 and 37, the pipe 36 having a throttle valve 38 therein, and the pipe 16 is also connected to the port 34 by means of a pipe 39 and the pipe 37, the pipe 39 having a ball check valve 40 therein. The port 34 admits fluid to or discharges it from the right hand end chamber 32 of the cylinder 17.

When the pipe 15 is connected to pressure and the pipe 16 is connected to exhaust, the slidable valve member 18 is moved to the right, fluid entering the left hand end chamber 31 of the cylinder 17 through the pipe 29, ball check valve 30, pipe 27 and port 24, and fluid exhausting from the right hand end chamber 32 of the cylinder 17 through the port 34, pipe 37, pipe 36 and throttle valve 38. The slidable valve member 18 moves a full stroke to the right and at a speed determined by the setting of the throttle valve 38. When, on the other hand, the pipe 16 is connected to pressure and the pipe 15 is connected to exhaust, the slidable valve member 18 is moved to the left, fluid entering the right hand end chamber 32 of the valve cylinder 17 through the pipe 39, ball check valve 40, pipe 37 and port 34, and fluid exhausting from the left hand end chamber 31 of the valve cylinder 17 through the port 24, pipe 27, pipe 26 and the throttle valve 28. The slidable valve member 18 moves a full stroke to the left and at a speed determined by the setting of the throttle valve 28.

Whenever the slidable valve member 18 makes one complete stroke, either to the right or to the left, the piston 11 makes a complete reciprocation, i. e. a double stroke, but the amplitude of such double stroke is controllable by the speed of the valve piston 18 and otherwise, and this variable amplitude produces a variable compensation.

Figure 2:
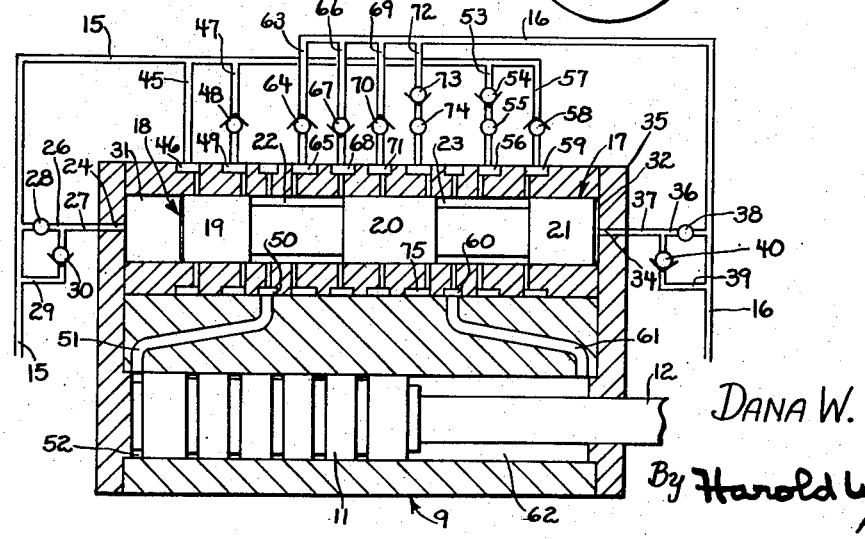
Fig. 2 is a similar sectional view through the motor together with the piping diagram but showing the control valve in a right hand end position.

Referring to Figs. 1 and 2, to explain how the single stroke of the slidable valve member 18 produces a double stroke of the actuating piston 11 and how the amplitude of the double stroke of the piston 11 is regulated, I shall first identify the several pipes, valves, ports and passages and then describe the action. The pipe 15 is connected by a pipe 45 to a port 46. The pipe 15 is connected by a pipe 47 having a ball check valve 48 to a port 49. A port 50 is connected by a passage 51 to the left hand end chamber 52 of the cylinder 10. The pipe 15 is also connected by a pipe 53 having a ball check valve 54 and a throttle valve 55 to a port 56 and by a pipe 57 having a ball check valve 58 to a port 59. A port 60 is connected by a passage 61 to the right hand end chamber 62 of the cylinder 10. The pipe 16 is connected by a pipe 63 having a ball check valve 64 to a port 65. The pipe 16 is further connected by a pipe 66 having a ball check valve 67 to a port 68. The pipe 16 is further connected by a pipe 69 having a ball check valve 70 to a port 71. The pipe 16 is further connected by a pipe 72 having a ball check valve 73 and a throttle valve 74 to a port 75.

Assume now that the pipe 15 is connected to pressure and the pipe 16 is connected to exhaust. The port 46 is therefore under pressure and fluid under pressure passes through the valve chamber 22 to the port 50 and through the passage 51 to the left hand end chamber 52 of the cylinder 10 therefore starting the piston 11 to the right. At that time fluid can exhaust from the right hand end chamber 62 of the cylinder 10 by way of the passage 61, port 60, valve chamber 23, port 75, pipe 72, throttle valve 74, and the check valve 73 to the pipe 16. When the slidable valve member 18 has moved slightly to the right, the exhaust passages are the same but the fluid now flows to the left hand end chamber 52 of the cylinder 10 via the pipe 47, ball check valve 48, port 49, valve chamber 22, port 50 and passage 51. The speed of the piston 11, during practically the entire stroke in either direction of the slidable valve member 18, is controlled by the setting of the throttle valve 74. When the slidable valve member 18 reaches the right hand end of its stroke, fluid under pressure in the pipe 15 passes through the pipe 57 and the ball check valve 58 into the port 59 and through the valve chamber 23 through the port 60 and through the passage 61 to the right hand end chamber 62 of the cylinder 10 to move the piston 11 toward the left. During this movement of the piston 11, fluid in the left hand end chamber 52 of the cylinder 11 exhausts through the passage 51, the port 50, the valve chamber 22, the port 68, the pipe 66, and the ball check valve 67 into the pipe 16.

Assume now that the pipe 16 is connected to pressure, the pipe 15 is connected to exhaust and the slidable valve member 18 is at the right hand end of its stroke. Fluid now flows from the pipe 16, through the pipe 63, and the ball check valve 64, into the port 65 and through the valve chamber 22, through the port 50 and through the passage 51 to the left hand end chamber 52 of the cylinder 10 to move the piston 11 toward the right. During this movement of the piston 11, fluid exhausts from the right hand end chamber 62 of the cylinder 10 through the passage 61, the port 60, the valve chamber 23, the port 56, the pipe 53, the throttle valve 55 and the check valve 54 to the pipe 15. The piston 11 therefore starts moving to the right and at a rate controlled by the throttle valve 55. This condition continues until the slidable valve member 18 practically reaches the end of its stroke to the left whereupon fluid flows from the pipe 16 through the pipe 69, the ball check valve 70, the port 71, valve chamber 23, the port 60, the passage 61 to the right hand end chamber 62 of the cylinder 10 to move the piston 11 toward the left. During this movement of the piston 11, fluid exhausts from the left hand end chamber 52 of the cylinder 10 through the passage 51, the port 50, the valve chamber 22, the port 46, the pipe 45 to the pipe 15. It will be seen that by means of the throttle valves 55 and 74, the speed of the piston 11 can readily be adjusted and thereby the length of its stroke can be adjusted assuming a certain speed of the valve piston 18 but that also is adjustable. Therefore a wide range of lengths of stroke can be given to the piston 11.

A fluid pressure source is provided, such as a motor driven fluid pump 80 which draws fluid through a pipe 81 from a reservoir 82 and forces fluid under pressure through a pipe 83 to a control valve 86. A pipe 84 connected with the pipe 83 is provided with an adjustable pressure relief valve 85 by means of which the desired operating pressure may be maintained within the system. The control valve 86 is a piston type valve comprising a valve stem 87 having a plurality of spaced valve pistons 88, 89, 90, and 91 formed integrally therewith, which serve to form a plurality of valve chambers 92, 93, and 94.

As illustrated in Fig. 1, fluid under pressure in the pipe 83 enters the valve chamber 93 and passes into the pipe 15. In this position of the valve 86, fluid in the pipe 16 may exhaust into the valve chamber 94 and through a pipe 95 into the reservoir 82.

The hydraulic motor above described is suitable for various applications where a single reciprocatory stroke of the motor piston is desired. For example, this motor is applicable for actuating a feed compensating mechanism such as that shown in Figure 3. A yoked member 100 is mounted on the end of the piston rod 12. The yoked member 100 engages grooves in a sleeve 101 which is mounted on the right hand end of a slide rod 102. Rack teeth are formed on the left hand end of the slide rod 102 which mesh with teeth on a gear segment 104 which is rotatably supported on a shaft 105. A stud 106 is mounted on the gear segment 104 to support a ratchet pawl 107 which engages the teeth of a ratchet wheel 108. The ratchet wheel 108 is keyed on the upper end of the shaft 105. A compression spring 109 serves normally to maintain the ratchet pawl 107 in engagement with the teeth on the ratchet wheel 108.

Figure 3:
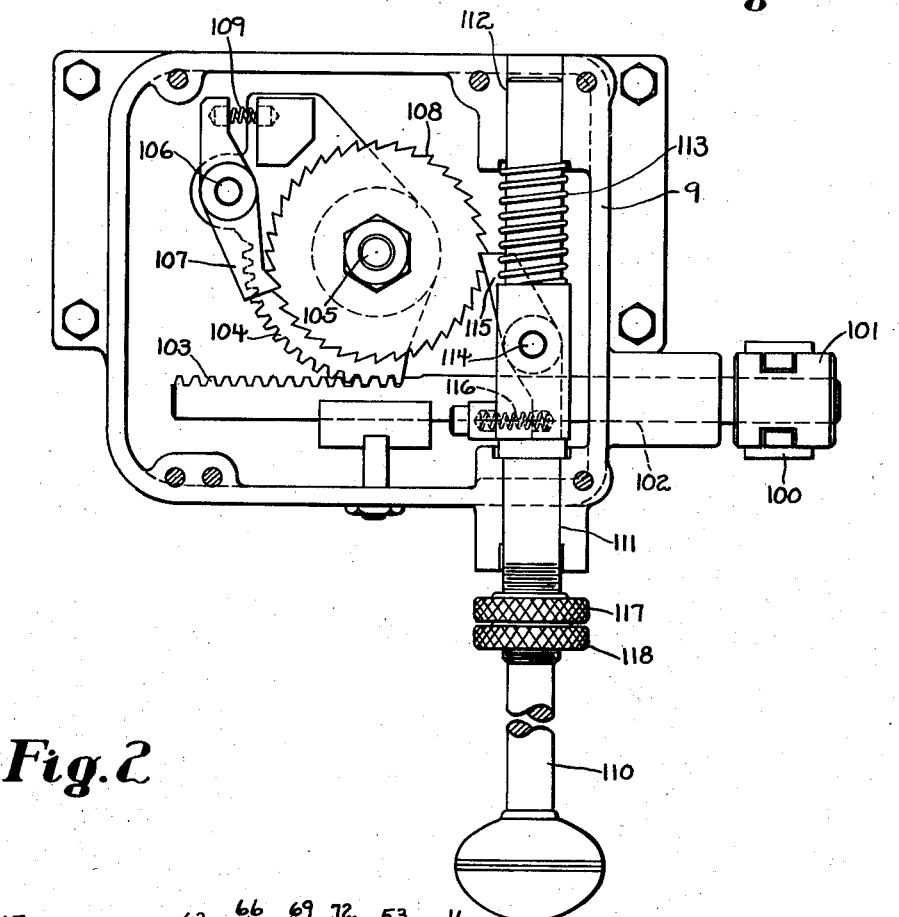
Fig. 3 is a plan view, on an enlarged scale, of a feed compensating mechanism.

To facilitate a manual actuation of the ratchet wheel 108, a manually operable slide rod 110 is slidably supported in bearings 111 and 112 formed in the casing 25. A compression spring 113 normally serves to hold the rod 110 in a downward position (Fig. 3). The rod 110 carries a stud 114 which supports a pawl 115. The pawl 115 is maintained in operative engagement with the teeth of the ratchet wheel 108 by means of a compression spring 116. When it is desired to manually adjust the ratchet wheel 108, the rod 110 is manually moved in an upward direction (Fig. 3) so that the pawl 115 will impart a rotary motion to the ratchet wheel 108. A stop collar or nut 117 threaded on the rod 110 serves to limit the stroke of the rod 110. By adjustment of the position of the nut 117, the length of stroke of the rod 110 may be varied so that one or more teeth of the ratchet wheel may be picked up at each actuation of the rod 110. A lock nut 118 serves to lock the nut 117 in adjusted position. The shaft 105 may be connected to any suitable mechanism such as for example a feed screw mechanism for adjusting the position of a machine tool part (not shown).

The operation of this fluid motor will be readily apparent from the foregoing disclosure. By manipulation of the control valve 86, fluid under pressure may be passed either through the pipe 15 or the pipe 16. In the position of the parts as shown in Fig. 1, fluid under pressure is passed through the pipe 15 and exhausted through the pipe 16. By manipulation of the throttle valves 28 and 38, the speed of movement of the shuttle-type control valve 18 may be varied as desired. By adjustment of the throttle valves 55 and 74, the speed of movement of the piston 11 may be precisely regulated. By adjustment of the speed of movement of the shuttle-type slidable control valve member 18 and by adjustment of the throttle valves 55 and 74, the speed of movement of the piston 11 may be readily adjusted and the length of stroke thereof varied as desired.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a hydraulic motor having a casing, a piston and cylinder therein, a piston rod to transmit movement of said piston, a shuttle-type control valve having a pair of spaced valve chambers, independent passages between said valve chambers and the opposite ends of said cylinder, fluid connections including independent adjustable throttle valves to shift said valve member in either direction at any adjustably controlled rate and means including independent fluid pressure supply and exhaust pipes each having a plurality of spaced ports connecting with said valve to control the admission to and exhaust of fluid from said control valve and cylinder, said ports serving during the initial movement of said valve in one direction to admit fluid under pressure to one of the valve chambers to cause the piston to move in one direction after which fluid under pressure is admitted to the other valve chamber so as to cause the piston to move in the opposite direction.

2. In a hydraulic motor having a casing, a piston and cylinder therein, a piston rod to transmit movement of said piston, a shuttle-type control valve having a pair of spaced valve chambers, independent passages between said valve chambers and the opposite ends of said cylinder, independent fluid connections including independent adjustable throttle valves to shift said valve member in either direction at an adjustably controlled rate, said fluid connections also being connected to admit fluid to and from said valve chambers, and a plurality of spaced ports connecting said fluid connections with each of said valve chambers to control the admission to and exhaust of fluid from said control valve and cylinder, said ports being arranged so that during the initial movement of said valve member in either direction, fluid under pressure is admitted to one of said valve chambers to cause the piston to move in one direction after which fluid under pressure is admitted through other of said ports to the second valve chamber to cause the piston to move in the opposite direction so that movement of the control valve in one direction serves to impart one complete reciprocation to the piston.

3. In a hydraulic motor having a casing, a piston and cylinder, a piston rod to transmit movement of said piston, a shuttle-type control valve including a slidably mounted valve member having a pair of spaced valve chambers, independent fluid passages between said valve chambers and the opposite ends of said cylinder, fluid connections to shift said valve member in either direction at an adjustably controlled rate, fluid connections including a plurality of spaced ports having check valves to control the admission to and exhaust of fluid from said control valve chambers, and a pair of independent throttle valves to control the rate of exhaust of fluid from opposite ends of said cylinder to facilitate independently controlling the speed of movement of said piston in either direction, said ports and check valves serving during the initial movement of said valve member in one direction to control the admission of fluid to one of the valve chambers to cause the piston to move in one direction and thereafter to control the admission of fluid to the other valve chamber to cause the piston to move in the opposite direction to impart one complete reciprocation to the piston.

4. In a hydraulic motor having a casing, a piston and cylinder therein, a piston rod to transmit movement of said piston, a shuttle-type control valve in said casing including a slidable valve member having a pair of spaced valve chambers, independent passages between said valve chambers and the opposite ends of said cylinder, fluid connections to shift said valve member in either direction, independent speed control valves independently to control the rate of movement of said valve member in either direction, means including a plurality of spaced ports having check valves to control the admission to and exhaust of fluid from said valve chambers so that during one stroke of said valve member the piston will move through one complete reciprocation, and means including a pair of independent throttle valves to control the rate of exhaust of fluid from opposite ends of said cylinder to control the speed of movement of said piston, the speed of movement of said valve member and the setting of said throttle valves serving to determine the length of stroke of said piston.

5. In a hydraulic motor having a casing, a piston and cylinder therein, a piston rod to transmit movement of said piston, a shuttle-type control valve in said casing including a slidable valve member having a pair of spaced valve chambers, an end chamber at each end of said valve, independent pipes to convey fluid under pressure to one of said end chambers while exhausting fluid from the other of said end chambers, a throttle valve to control the rate of movement of the valve member, independent fluid passages between said valve chambers and the opposite ends of said cylinder, means including a speed throttle valve to control the rate of exhaust of fluid from one end of said cylinder to regulate the speed of movement of said piston, and means to reverse the flow of fluid to said cylinder when the valve member reaches the end of its movement, the speed of movement of said valve member and the rate of fluid exhausting from the cylinder serving to determine the length of stroke of said piston.

DANA W. MARTIN.

REFERENCES CITED

The following references are of record in the file of this patent:

UNITED STATES PATENTS

| Number | Name | Date |
|---|---|---|
| 2,246,461 | Cannon, Jr. | June 17, 1941 |
| 2,253,617 | Griffith | Aug. 26, 1941 |
| 2,267,177 | Twyman | Dec. 23, 1941 |